(No Model.)
J. LYALL.
TUBULAR WHEEL TIRE.
No. 576,371. Patented Feb. 2, 1897.
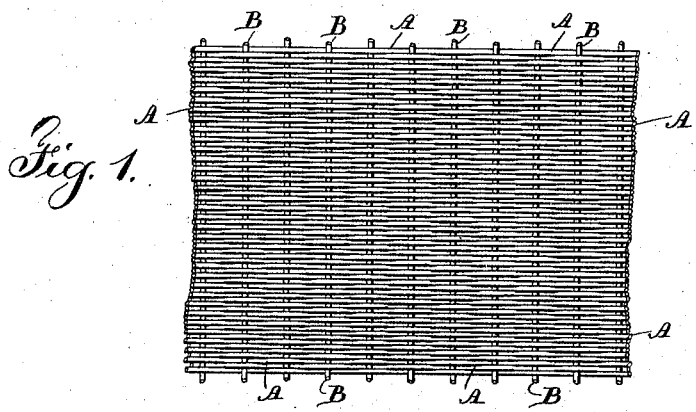
Fig. 1.
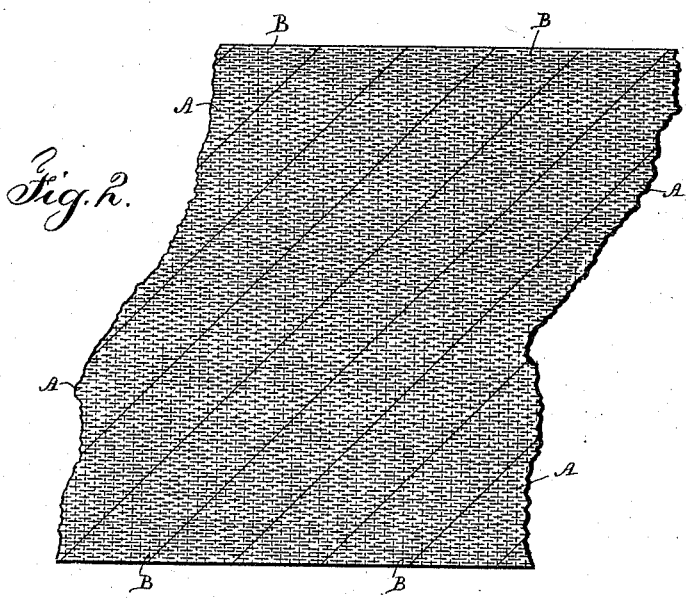
Fig. 2.
Fig. 3.
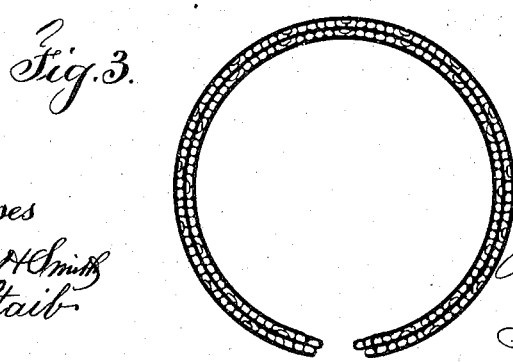
Witnesses
Chas. H. Smith
J. Staib
Inventor
James Lyall
per
Lemuel W. Serrell
Atty.

UNITED STATES PATENT OFFICE.

JAMES LYALL, OF NEW YORK, N. Y.

TUBULAR WHEEL-TIRE.

SPECIFICATION forming part of Letters Patent No. 576,371, dated February 2, 1897.

Application filed April 25, 1895. Serial No. 547,113. (No model.)

*To all whom it may concern:*

Be it known that I, JAMES LYALL, a citizen of the United States, residing in the city, county, and State of New York, have invented an Improvement in Tubular Wheel-Tires, of which the following is a specification.

In the manufacture of pneumatic tires for bicycles and other vehicles a fabric has been made use of in which the warp and weft threads correspond, or approximately so, both in strength and condition, and this fabric in the form of heavy duck or canvas has been cut up into strips diagonally and formed into a circular tire for the reception of the inflated tube of the pneumatic bicycle-tire. Efforts have also been made to employ warp-threads parallel to each other and held in position by a sheet of rubber, such warp-threads being applied diagonally in the circular bicycle-tire, so that the air-pressure in expanding the inner tube tends to shorten the length of the tire and thereby contract the same firmly around the wheel. Difficulty has been experienced in holding the warp-threads in their proper positions while the rubber has been applied to the same in the calendering apparatus, and it will be apparent that in cases where a single warp-thread may break an undue strain is thrown upon other threads and the liability of breakage is increased.

In my present invention I make use of warp and weft threads of the same size and strength, or approximately so, and the threads passing in one direction are laid closely together, while those passing in the other direction are at a considerable distance apart, but yet sufficiently near together to prevent the threads that run in the other direction becoming crossed or entangled. Hence the open threads hold the close threads in their proper relative positions and aid in strengthening the fabric as a whole, and the fabric woven with the close threads and the open crossing threads can be handled as usual and woven in one place and the rubber applied to the surfaces of the fabric in another place, thus greatly facilitating the respective operations, and in making up the wheel-tire the fabric before mentioned is cut up into strips diagonally to the threads after the rubber has been applied to the fabric, and then the ends of the strip are brought together in forming the circular wheel-tire and the parts are properly shaped up and cemented with rubber in any usual manner, so as to be adapted to form the tire for the inflated tube in the bicycle or other wheel.

In the drawings, Figure 1 is a diagrammatic illustration of the close and open threads in the fabric. Fig. 2 shows the strip as cut off diagonally and adapted to being bent up into the circular form, and Fig. 3 is a cross-section representing the two strips with rubber upon both surfaces of the fabric.

If the warps lie closely together, the weft-threads will be interwoven at a distance apart, as before mentioned. If the warp-threads are at a distance apart, the weft-threads can be laid in and beaten up closely together, it being immaterial which mode of weaving is adopted. I have, however, represented in Fig. 1 the warp-threads A as lying closely together and the weft-threads B as at a distance apart, say a quarter of an inch to a half-inch apart, and the open crossing threads B are advantageously the same size and strength, or approximately so, as the close threads A, and the fabric thus woven is to be coated with india-rubber on one or both sides, and it will be apparent that the open crossing threads B hold the threads A, that are close together, in their proper relative positions and effectually prevent any disarrangement or crossing of the threads that are close together, especially after the weaving has been performed and before and during the operation of calendering and applying the rubber to one or both surfaces of the fabric.

It is to be understood that the calendering operation and the surfacing with the rubber can be performed in any well-known manner and that in consequence of my fabric being woven as aforesaid no special or unusual apparatus is required in the calendering operation or in the applying of the rubber.

The woven fabric is cut up in strips diagonally, so that the crossing threads are at an angle of forty-five degrees, or nearly so, to the edges of the strips, and the strips are to be of the desired width to accommodate the size and shape of the circular tire, and a second strip of fabric, prepared in the same way as the first, is laid upon the first strip in such a way that the threads that are close together in one strip cross at right angles to those that are close together in the other strip, and the tire is made up in a circle and of the desired size and shape sectionally and connected with the wheel and incloses the pneumatic tube, which when inflated distends the tire, and the diagonal crossing threads cause the tire to shorten in its length and contract firmly around the wheel.

In the manufacture of fabrics for rubber tires linen threads have been extensively employed. There is, however, a peculiar action upon the rubber tire when in use that causes such linen threads to crack or break. By extended experiment I have found that by taking the long staple Sea Island cotton and combing out from the same the shorter staple or lint and spinning and weaving the same a fabric is obtained that is especially adapted to the manufacture of wheel-tires, because the staple is very fine and quite long and the fibers do not chafe and cut each other as much as the fibers of linen or similar material.

I claim as my invention—

1. The improved bicycle-tire composed of a woven fabric having threads closely laid in one direction and threads laid in the other direction that are open at nearly uniform distances apart and serve to maintain the proper relative positions of the closed threads and coated with rubber, and two strips cut diagonally of the fabric and laid together with the close threads crossing each other substantially at right angles and formed up into a circular wheel-tire, substantially as specified.

2. A tire-cover having a plurality of layers of bias fabric, such fabric having the threads in one direction closely placed and those in the other direction sparse, adjacent layers of such fabric being cut or placed opposite ways of the bias of the fabric, substantially as set forth.

Signed by me this 23d day of April, 1895.

JAMES LYALL.

Witnesses:
DUDLEY T. LYALL,
DANIEL D. TELFORD.